H. ALDRIDGE.
SHOE FOR GRAIN SEPARATORS.
No. 1017
Reissued July 31, 1860
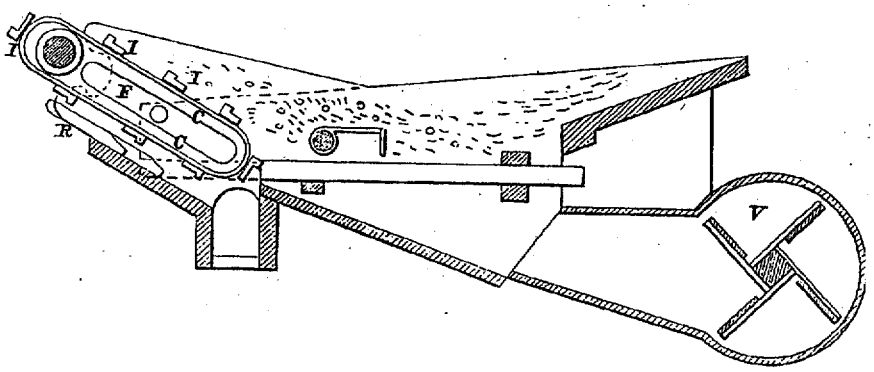
TAKEN FROM PATENT OFFICE REPORT
1859 VOL. II.
ONLY DRAWING ACCESSIBLE (1918)

UNITED STATES PATENT OFFICE.

HIRAM ALDRIDGE, OF MICHIGAN CITY, INDIANA.

SHOE FOR GRAIN-SEPARATORS.

Specification forming part of Letters Patent No. 24,084, dated May 24, 1859; Reissued July 31, 1860, No. 1,017.

*To all whom it may concern:*

Be it known that I, HIRAM ALDRIDGE, of Michigan City, in the county of La Porte and State of Indiana, have invented a new and useful Improvement in Shoes for Grain-Separators; and I do hereby declare that the following is a full, clear, and exact description of the same, reference being had to the accompanying drawings, forming a part of this specification, in which—

Figure 1, represents a vertical longitudinal section through the shoe, and Fig. 2, represents a side view, Fig. 3, represents a top plan, Fig. 4 represents an end view, Fig. 5, represents a frame covered with perforated sheet iron for sieve, Fig. 6, represents a slant or tail board, and Fig. 7, represents an end view of the lag or cross slat to the chaff and straw elevator.

Similar letters of reference, in each of the several figures, indicate corresponding parts.

The novelty of my invention lies in the application of certain devices hereafter named directly to a separator shoe, a thing never before done, so far as my knowledge extends.

The nature of my invention consists 1st in the combination and arrangement of an inclined lagged chaff and straw elevator, primary inclined return sieve or board and separator shoe, in the manner hereinafter described.

It consists 2nd, in the combination of a secondary inclined extension tail or return board, with the chaff elevator, inclined sieve or primary return board, and separator shoe, in the manner hereinafter described. 3rd, in the combination of an inclined lagged elevator with a separator shoe, when said elevator is placed in rear of and above the main cleaning sieve of the shoe, in an inclined position, so as to admit of the application of a powerful blast, for thoroughly cleaning the grain without blowing over or washing the same to a great extent.

The elevator belt with slats or lags obviates danger of clogging and excessive accumulation, by elevating and carrying off from the incline sieve, the chaff, straw and other impurities which are forced outward from the main cleaning sieve by the blast from the fan mill. And the extension incline tailboard enables me to adjust the shoe to suit light and heavy blasts, as hereinafter described.

To enable others, skilled in the art, to make and use my invention I will proceed to describe its construction and operation.

A, represents the frame of an ordinary shoe in which the incline extension slant board R, the incline sieve F, elevating belt C, C, and ordinary cleaning sieve K, is encased. B, is a shaft supported at each end by sides of frame A, and provided with a pulley D, just outside of frame A, over which an endless belt may pass connecting back to a pulley at some convenient point in the separator or fan mill to give motion to pulleys E, E, on said shaft just inside of shoe frame A, over which the endless elevating belt C, C, passes to obtain motion.

F, is a sieve frame preferably covered with perforated sheet iron, and provided at its lower end with idle pulleys G, G, revolving on pins or journals H, H, made fast and stationary to sieve frame F. The idle pulleys G, G, act in concert with working pulleys E, E, in propelling incline elevator belt C, C. The sieve frame F, may be covered with perforated sheet iron, as shown in Fig. 5, or screen wire, or may be covered over tight with thin board or any tight substance, same results being accomplished in either case, viz; the returning of the grain to the receptacle O.

The sieve F, is fastened in the shoe inclining inward and made stationary by tightening the thumb screw J. which passes through the sieve frame and through the side of the shoe frame, this sieve can also be elevated and changed to any desired angle, being adjustable on loosening thumb screw J.

The elevator belt C, C, revolves upward just clearing the top surface of incline sieve F, and returning underneath the same.

The advancing edge of lags or slats I, are provided with flanges at right angles with the top and bottom surfaces of the same, as shown in Fig. 7, end view.

K, is the ordinary cleaning sieve with holes L, in both sides of the frame, in which hooks M, which are fastened to the sides of the shoe are to be inserted, so as to hold the sieve stationary and also to afford the means by which to move the sieve K, back and forward and thereby increase or entirely close the space between sieve K, and lags I in the elevator belt.

The grain after being threshed by a cylinder not shown, works its way in the usual process to the back end of the separator, then falls on slant board N, and is worked down by the shaking motion of the shoe on to the cleaning sieve K, where it comes in contact with the blast from the fan mill V, which blows off the light chaff and straw entirely beyond the elevated sieve and belt. By this means, the main portion of the grain is thoroughly cleaned before it falls through the meshes of the sieve K, into a suitable reservoir below; but a large amount of light grain and unthreshed grain heads are forced and lifted forward by the strong blast necessarily applied to clean the grain rapidly, which lodging at different points of the sieve F, is forced upward over the end of the shoe by the lags I, which just clear the top surface of the sieve F, sufficiently to allow the grain to return underneath the same. This grain, in its descent, falls through the open spaces *y*, *y*, between lags I, into and through sieve F, and passes down into a spout below and escapes through the opening O, which leads as usual to the threshing cylinder. It will however still be evident that there is a great deal of unthreshed grain heads and more or less shrunk or light grain forced upward and over the top of the incline sieve F, by the upward movement of lags I, and to save this I provide an incline extension tailboard R, which operates as follows: A portion of the blast from fan V, strikes the incline shoe bottom P, passes upward along the same, is forced across the reservoir or tailing spout O, thence over the incline board 2, and underneath the upper or elevated extremity of incline sieve F, and elevator belt C, C, and over the tail-board R. This operation of the blast causes such light and worthless stuff as may have been forced upward by lags I, to be blown away free of grain. But the blast at this point is at times sufficiently strong to blow over and waste such grain as may have been forced over with the foul stuff at the extreme end of the shoe. To avoid this, the extension incline tail-board R, is brought into use. This board moves in inclined side grooves S, of shoe A, and by moving it out in the grooves, the length of the bottom board Q, of shoe A, is increased or extended, and thus the blowing over of anything but the light and worthless impurities avoided, the grain thus saved returns down the incline boards R, and Q, and finds its way to the reservoir or return spout from whence it passes off through opening O, as before described. A thumb screw T, fastened to the side of the shoe, answers by its pressure on the end of the extension slant-board R, to hold said board in any position to which it may be adjusted, and also affords convenience for readily adjusting the board. N represents the blocks or guides fastened to the sides of the shoe frame A, to steady and hold stationary the sieve K.

The shoe A, thus described, has in general construction and form, a resemblance to the common shoe in use, excepting so much as alludes to my invention, the operation and application of which is connected with the ordinary shoe being already described in detail. I will proceed to describe the difficulties in operating the common shoe, without the application of my invention.

The frame of the ordinary shoe is the same, or nearly so, as shown in Fig. 1, after removing the incline sieve F, belt C, C, with lags I, tail-board R, shaft B, and its pulleys D, and E, E, thumb screws T, and J, and also cutting down side and end of shoe frame corresponding with dotted lines W, W, W, W, W, and extending sieve K, out to end in a straight line as shown by dotted lines X, X, X, X, X, or instead of extending sieve K, out to end in a straight line, a separate sheet iron or tight sieve is usually inserted.

The power driving the threshing machine and separator is always subject to great variation, the fanning mill and shoe being attached to the same is subject to much irregularity in speed, the blast at times being too strong and again not strong enough, in the former case grain would be lifted and carried over the outward end of the shoe and in the latter the blast being weak grain and chaff would rapidly accumulate on the sieve and clog, and require aid to clear it, again the same difficulty might occur from unsteady feeding at the cylinder, even when power is steady and regular, taxing the shoe more at one time than another, hence we see there is liability to blow too strong and not strong enough, as well as danger of unsteady feeding, and in either case there is a liability to clog the sieve and not clean the grain well for want of blast and also liability to waste and blow over grain by having too much blast.

It is evident that the shoe would clog if the blast was not applied injuriously strong, to simply insert the incline sieve or tight board F, for the purpose of arresting the grain in its outward flight and to save and separate the same from chaff, &c., but by inserting with it the elevator belt C, C, with the lags I, this difficulty of operating the common shoe is obviated to a very great extent and by inserting the inclined extension board R, or extending the bottom board Q, as occasion may require, the difficulty is completely obviated.

When my invention or improvement is inserted and operated in an ordinary separator shoe, as previously described, the following difficulties which it is apparent exists in the ordinary shoe, are effectually overcome. 1st. Liability to imperfectly clean grain for want of blast. 2nd. Liability to blow over and waste the same by having too much blast. 3rd. Liability to clog on the sieve for want of blast and also by unsteady feeding of the cylinder.

What I claim as my invention and desire to secure by Letters Patent, is—

1. The combination and arrangement of an inclined lagged chaff and straw elevator C, I, primary inclined return sieve or board F, and separate shoe A, substantially as and for the purposes set forth.

2. The combination of a secondary inclined extension tail or return board R, with the chaff elevator C, I, incline sieve, or primary return board F, and separator shoe, A, substantially as and for the purposes set forth.

3. The combination of an inclined lagged elevator C, I, with a separator shoe A, when said elevator is placed in rear of and above the main cleaning sieve of the shoe, in an inclined position, substantially as set forth.

HIRAM ALDRIDGE.

Witnesses:
GOODWIN Y. AT LEE,
ROBT. W. FENWICK.

[FIRST PRINTED 1911.]